(12) United States Patent
Charay et al.

(10) Patent No.: US 6,732,441 B2
(45) Date of Patent: May 11, 2004

(54) LEVELING TOOL

(76) Inventors: Dale J. Charay, 1737 SE. Indiana, Topeka, KS (US) 66607; Jeff W. Berberick, 2224 Wilmington Ct., Topeka, KS (US) 66607

(*) Notice: Subject to any disclaimer, the term of this patent is extended or adjusted under 35 U.S.C. 154(b) by 0 days.

(21) Appl. No.: 10/350,549

(22) Filed: Jan. 22, 2003

(65) Prior Publication Data

US 2003/0136013 A1 Jul. 24, 2003

Related U.S. Application Data

(60) Provisional application No. 60/352,125, filed on Jan. 24, 2002.

(51) Int. Cl.[7] .............................. G01C 9/00; G01B 1/00
(52) U.S. Cl. .............................. 33/370; 33/518; 33/533; 15/235.4; 7/164
(58) Field of Search ................. 33/333, 334, 370, 33/371, 451, 533, 518, 290, 291, 292; 15/235.4, 235.3, 235.5, 235.1, 235.8; 7/164

(56) References Cited

U.S. PATENT DOCUMENTS

| | | | | |
|---|---|---|---|---|
| 606,851 A | * | 7/1898 | Ware | 33/651 |
| 1,067,301 A | * | 7/1913 | Bricker | 15/235.8 |
| 1,116,656 A | * | 11/1914 | Widemire | 33/202 |
| 1,196,564 A | * | 8/1916 | McClelland | 33/451 |
| 3,018,499 A | * | 1/1962 | Levy | 15/235.4 |
| 4,578,989 A | * | 4/1986 | Scott | 73/54.03 |
| 6,003,192 A | * | 12/1999 | Ciminise et al. | 15/235.5 |
| 6,568,021 B1 | * | 5/2003 | Wood | 15/235.4 |
| 6,625,951 B1 | * | 9/2003 | McCarthy | 52/747.1 |

\* cited by examiner

Primary Examiner—Diego Gutierrez
Assistant Examiner—Travis Keis
(74) Attorney, Agent, or Firm—Chase Law Firm, L.C.

(57) ABSTRACT

A leveling device for a construction material surface surrounding a drainpipe presents an elongated beam having a central seat therein for reception of the end of a drainpipe therein. Upon a seating of the drainpipe, a pair of opposed inclined surfaces contact the construction material surrounding the drainpipe. Rotation of the beam about the drainpipe presents a smoothed, inclined surface about the drainpipe with the excess poured material being collected in pockets in a sidewall of the device. The depth of the inclined surfaces below the drainpipe top can be regulated. Bubble levels assure a proper orientation of the beam during rotation.

20 Claims, 2 Drawing Sheets

LEVELING TOOL

CROSS REFERENCE TO RELATED APPLICATION

This application claims the benefit of a prior filed, co-pending provisional application Serial No. 60/352,125, filed Jan. 24, 2002, entitled MUD MASTER.

BACKGROUND OF THE INVENTION

This invention pertains to a leveling tool and, more particularly, to a tool for providing a smooth, inclined surface about a drain or the like.

In concrete/mud work it is desirable to provide an inclined, finished surface about a drainpipe or the like, the surface being inclined about the drainpipe so as to direct water thereto. Such surface may either then remained unfinished, as in an outside drain, or have tile mounted thereon as in a bathroom. It is thus desirable to provide a leveling tool which allows the worker to easily provide this inclined, smoothed surface.

In response thereto we have provided a leveling tool in the form of an elongated beam having a centrally located seat which receives the open end of-the drainpipe therein. Extending from this central seat in opposed directions is a pair of inclined surfaces. Each surface has an angle corresponding to the desired angle of inclination of the smoothed surface about the drainpipe. After the cement or other "mud"-like material has been poured about the drainpipe, the drainpipe is seated in the central seat such that the inclined surfaces extend away from the drainpipe in contact with the unfinished mud. User rotation of the device about the drainpipe, which acts as an axis of rotation, smoothes the poured material surface therebelow. During rotation of the device, pockets in the sidewall pick up the excess mud for transport away from the smoothed surface. Bubble levels in the device indicate that the device is at a proper position during rotation. A plate can be positioned within the seat so as to regulate the depth of penetration of the drainpipe within the seat and thus the depth of the smoothed surface below the top edge of the drainpipe.

It is therefor a general object of the invention to provide a device with leveling surfaces for presenting a smoothed surface about a drainpipe or the like at a desired inclination relative thereto.

Another object of this invention is to provide a device, as aforesaid, which presents a seat releasably engageable with the open end of the drainpipe, the leveling surfaces being rotatable about the drainpipe.

A still further object of this invention is to provide a device, as aforesaid, wherein the degree of penetration of the drainpipe into the seat can be adjusted.

Another object of this invention is to provide a device, as aforesaid, wherein pockets in the sidewall of the device pick up the excess mud material therein during smoothing of the poured material surface.

A particular object of the invention is to provide a device, as aforesaid, which has bubble levels therein for properly positioning the device during operation.

Other objects and advantages of this invention will become apparent from the following description taken in connection with the accompanying drawings, wherein is set forth by way of illustration and example, a now preferred embodiment of this invention.

DESCRIPTION OF THE PREFERRED EMBODIMENT

Figure 1:
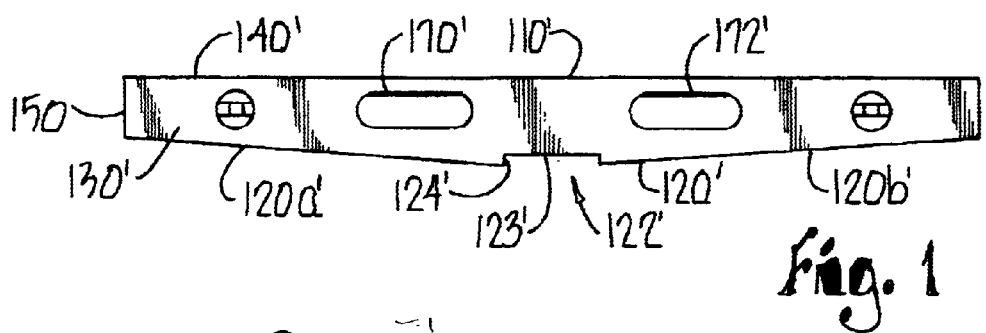
FIG. 1 is a diagrammatic view illustrating the general exterior configuration of an alternate embodiment of the device.
Figure 5:
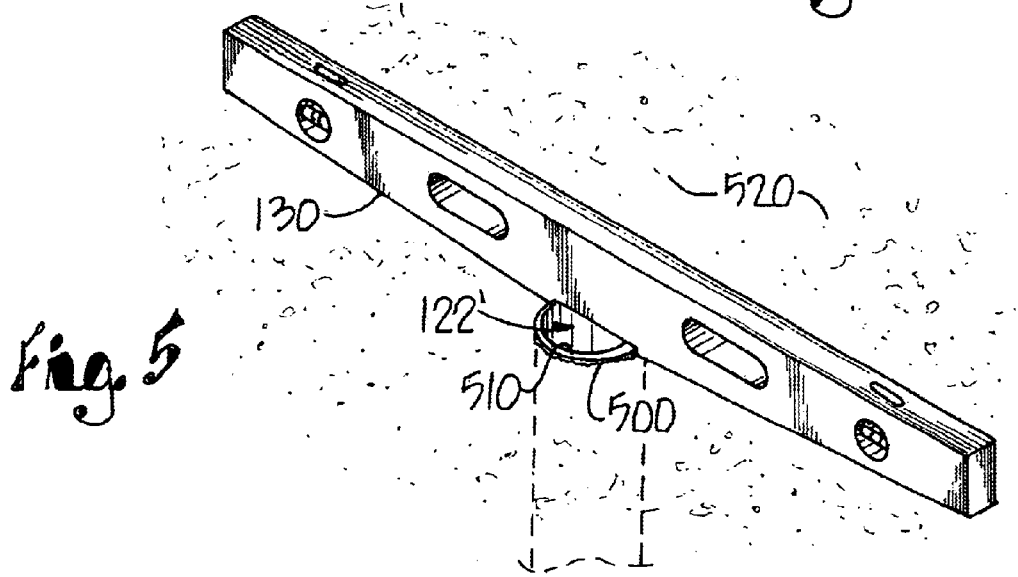
FIG. 5 is a diagrammatic view showing the initiation of the seating of the drainpipe into the tool seat and the unfinished surrounding surface prior to use of the device.
Figure 6:
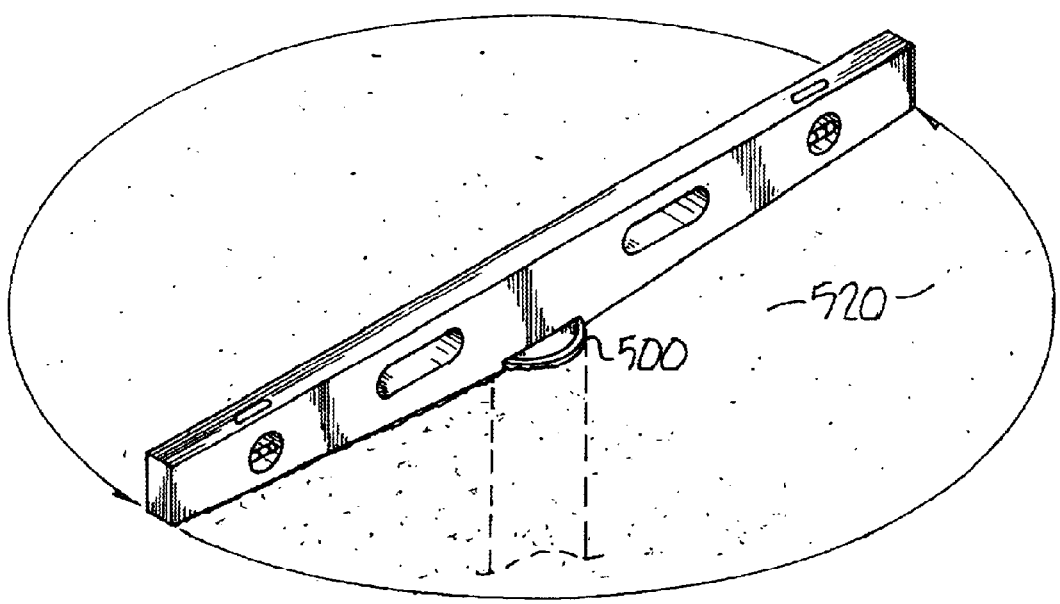
FIG. 6 is a second diagrammatic view showing the removal of the device from the drainpipe and the smoothed surrounding surface after use of the device.
Figure 2:
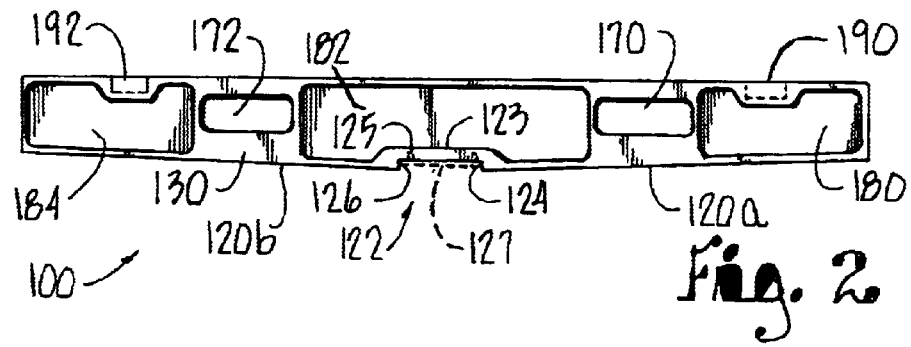
FIG. 2 is a side view of a preferred embodiment of the device.
Figure 3:
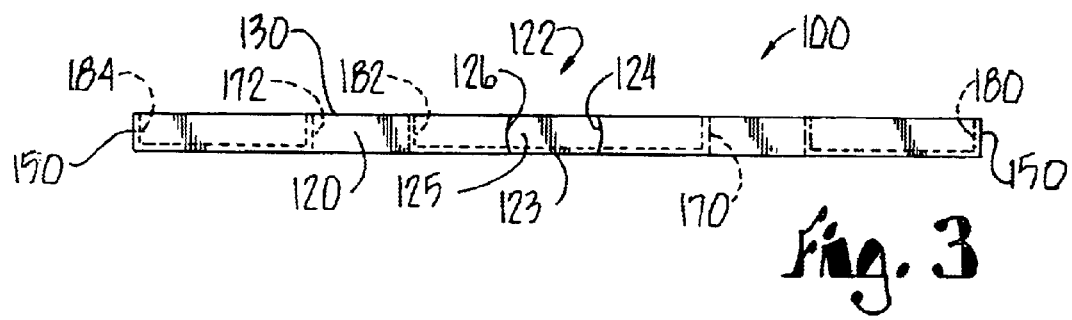
FIG. 3 is a bottom view of the preferred embodiment of the device.
Figure 4:
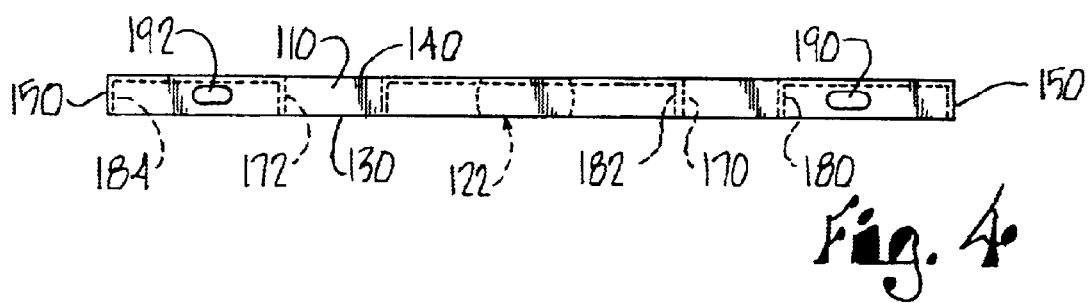
FIG. 4 is a top view of the preferred embodiment of the device.

Turning more particularly to the drawings, our now preferred embodiment 100 is shown in FIGS. 2–4 as being in the form of an elongated beam having a top 110, bottom 120, side 130, 140 and end 150 walls. Similar structure in the FIG. 1 alternate embodiment is shown with identical primed numbers. Centrally located within the bottom wall 120 of the beam is a recessed seat 122 presenting two arced walls 124, 126 and a seat bottom wall 123. This seat 122 receives the free end of a drainpipe 500 with the arc walls 124, 126 adapted to fit about the free vertical end 510 of the drainpipe 500 about the outside surface thereof. A bottom wall 123 of the seat 122 includes two apertures 125. Such apertures allow for a releasable screw fastening of a circular plate 127 (phantom lines, FIG. 2) therein so as to vary the depth of the bottom wall 123 of the seat 122 and thus the depth of projection of the free end 510 of drainpipe 500 into the seat 122.

Extending from the seat are two bottom wall planar surfaces 120a and 120b, which are inclined at an angle between the seat 122 and end walls 150. (Only one inclined surface need be presented.) This angle corresponds to a desired angle of the smoothed surface 520 relative to the drainpipe 500. The length of the inclined surfaces 120a, 120b corresponds to the desired radial length of the smoothed surface 520 surrounding the drainpipe 500.

Located with the sidewalls are slots 170, 172 which serve as handles for the user. Also located within the sidewalls is a plurality of recesses 180, 182, 184 (FIG. 2) acting as pockets. These pockets preferably do not extend entirely throughout the tool. Pockets 180, 182, 184 are designed for pick up of the excess mud on the smoothed surface during use of the tool as to be subsequently described. Bubble levels 190, 192 in the top wall 110 of the device indicate that the device is being held in a proper position during use.

In use the concrete/mud is first poured about the drainpipe. Accordingly, the free end of the drainpipe 500 is thus surrounded by an unfinished material surface 520 which must be subsequently smoothed by the worker. This smoothed surface 520 about the drainpipe should be inclined such that the water is directed into the open end of the drainpipe 500.

Accordingly, the free end of the drainpipe 500 is inserted into the seat 122 such that the free end of the pipe abuts the bottom wall 123 of seat or plate 127, if used. Thus, the inclined surfaces 120a, 120b rest on the relatively unsmoothed mud therebelow. As above described, the plate 127 may be releasably secured within the seat 122 so as to vary the depth of the seat bottom wall and thus the depth of penetration of the free end of drainpipe 500 into the seat 122.

In turn this penetration varies the depth of the smoothed surface below the drainpipe. This depth can be varied according to the thickness of the tile to be subsequently placed thereon, if any.

After seating the device, the drainpipe 500 acting as an axis of rotation for the device. It is preferred that the pockets 180, 182, 184 face the user, whether right handed or left handed, at the initiation of rotation. A right-handed user will then grasp a handle 172 and rotate the device in a clockwise direction towards the user with a left-handed user grasping handle 170 and rotating the device in a counterclockwise direction toward the user. As the pockets are preferably placed on only one sidewall of the device, pockets 180, 182 will pick up excess mud during counterclockwise rotation with pockets 182, 184 picking up mud during counterclockwise rotation. Moreover, as the pockets 180, 182, 184 preferably do not extend all the way through the device, any mud collected therein will not fall therethrough to the other side and on the material surface.

During a complete 360° rotation of the device about the drainpipe, the bubble levels 190, 192 are centered to assure the user that the device 100 is held in a proper position relative to the drainpipe. After such 360° rotation, the action of the planar, inclined surfaces 120*a*, 120*b* against the unsmoothed material 520, presents a smoothed, inclined surface 520 as aided by the appropriate pockets picking up the excess mud during tool rotation. Accordingly, the device can then be removed from the drainpipe 500 and the excess mud transported away from the inclined smoothed surface 520. The surface 520 is then ready for subsequent finishing.

Accordingly, we have found that our device provides an effective tool for quickly providing a smooth, inclined surface about a drainpipe or the like.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An improved leveling device for presenting an inclined smoothed surface of an unfinished construction material surrounding an open end of a drainpipe, the improved leveling device comprising:
   an elongated strut having a bottom wall;
   a seat within said bottom wall adapted for seating a free end of a drainpipe therein;
   said bottom wall including a pair of inclined surfaces, said surfaces extending in opposed directions from said seat, said inclined surfaces adapted to contact the material upon insertion of a free end of the drainpipe into the seat, said drainpipe presenting an axis of rotation for said strut thereabout;
   wherein a rotation of said strut about said drainpipe urges said inclined surfaces to smooth the material, a complete rotation of said strut about the drainpipe presenting an inclined, smoothed surface of the material about the drainpipe, an inclination of the material surface corresponding to the inclination of said inclined surfaces of said bottom wall.

2. The device as claimed in claim 1 wherein said device further comprises:
   at least one sidewall extending from said bottom wall;
   at least one pocket in said at least one sidewall, said pocket adapted to store excess material therein arising during said rotation.

3. The device as claimed in claim 1 wherein said seat comprises a recess in said bottom wall, said recess including a pair of curved surfaces adapted to fit about an exterior wall of the drainpipe upon said drainpipe insertion into said seat.

4. The device as claimed in claim 3 wherein said recess further presents a wall at the end thereof, said end wall adapted to abut a free end of the drainpipe upon insertion of the drainpipe in said recess, said abutment limiting the penetration of the free end of the drainpipe in said seat and the depth of the smoothed material surface below the free end of the drainpipe.

5. The device as claimed in claim 4 further comprising means for changing the depth of said end wall within said recess seat, whereby to vary the degree of penetration of the drainpipe within the recess and the corresponding depth of the smoothed material surface below the free end of the drainpipe.

6. The device as claimed in claim 5 wherein said changing means comprises:
   a plate;
   means for releasably engaging said plate to said end wall of said recess, whereby said plate presents a second end wall displaced from said recess end wall, said second end wall abutting the free end of the drainpipe.

7. The device as claimed in claim 1 further comprising slots in said beam for presenting handles for manipulation by the user.

8. The device as claimed in claim 1 further comprising bubble levels in said beam for maintaining a desired level relationship of the device during said rotation.

9. The device as claimed in claim 1 wherein a length of said inclined surface corresponds to a length of the smoothed surface radiating from the drainpipe.

10. A leveling device for presenting an inclined, smoothed surface of a construction material surrounding an open end of a drainpipe, the leveling device comprising:
    a beam having a bottom wall, at least one sidewall and a top wall;
    a central seat within said bottom wall adapted for seating a free end of a drainpipe therein;
    said bottom wall including a pair of inclined planar surfaces, said inclined surfaces extending in opposed directions from said seat, said inclined surfaces adapted to contact the construction material surrounding the drainpipe upon fitting the drainpipe into the seat, said drainpipe presenting an axis of rotation for said beam thereabout;
    at least one pocket in said at least one sidewall;
    wherein a rotation of said beam about said drainpipe causes said inclined surfaces to smooth the material therebelow with the at least one pocket collecting an excess of the material therein, a complete rotation of said beam about the drainpipe presenting an inclined, smoothed surface about the drainpipe, said inclination of said smoothed surface corresponding to the inclination of said inclined surfaces of said beam.

11. The device as claimed in claim 10 wherein said at least one pocket is located in only one sidewall of said beam.

12. The device as claimed in claim 10 further comprising means for orienting the beam at a proper position relative to said drainpipe.

13. The device as claimed in claim 10 wherein the seat is centrally located within said bottom wall.

14. An improved device for presenting an inclined, smoothed surface of a construction material, the improved leveling device comprising:

a beam having a bottom wall;

a portion within said bottom wall adapted for passage of a vertical axis of rotation extending from the construction material;

said bottom wall including at least one inclined surface, said at least one surface extending in a radial direction from said central portion, said at least one inclined surface adapted to contact the construction material upon extension of said axis through said central portion;

wherein rotation of said beam about the vertical axis causes said at least one inclined surface to smooth the material in contact therewith, a complete rotation of said beam about the vertical axis presenting an inclined, smoothed surface surrounding the axis, said inclination of said smoothed surface corresponding to said inclination of said at least one inclined surface of said beam.

15. The device as claimed in claim 14 wherein the vertical axis is presented by a drainpipe upwardly extending from the material.

16. The device as claimed in claim 15 wherein said portion comprises a seat adapted for receiving a free end of the drainpipe therein.

17. The device as claimed in claim 16 wherein said seat includes a recessed wall for abutting a free end of the drainpipe therein, said abutment limiting the depth of said inclined surfaces below the free end of the drainpipe.

18. The device as claimed in claim 17 comprising means for changing the location of said recessed wall within said seat.

19. The device as claimed in claim 14 further comprising:

at least one sidewall in said beam;

at least one pocket in said sidewall, said at least one pocket collecting excess material during said rotation.

20. The device as claimed in claim 14 wherein said portion includes a seat for receiving the vertical axis therein.

* * * * *

UNITED STATES PATENT AND TRADEMARK OFFICE
CERTIFICATE OF CORRECTION

PATENT NO. : 6,732,441 B2
DATED : May 11, 2004
INVENTOR(S) : Dale J. Charay and Jeff W. Berberick It is certified that error appears in the above-identified patent and that said Letters Patent is hereby corrected as shown below:

Column 4,
Line 65, after "improved" insert -- leveling --.

Column 5,
Line 11, after "wherein" insert -- a --.

Signed and Sealed this

Tenth Day of August, 2004

JON W. DUDAS
*Acting Director of the United States Patent and Trademark Office*